(12) United States Patent
Gharib et al.

(10) Patent No.: US 8,773,514 B2
(45) Date of Patent: Jul. 8, 2014

(54) ACCURATE 3D OBJECT RECONSTRUCTION USING A HANDHELD DEVICE WITH A PROJECTED LIGHT PATTERN

(75) Inventors: Morteza Gharib, Altadena, CA (US); Jian Lu, Laguna Hills, CA (US); Alexei Harvard, Pasadena, CA (US); Scott Hsieh, Anaheim, CA (US)

(73) Assignee: California Institute of Technology, Pasadena, CA (US)

( * ) Notice: Subject to any disclaimer, the term of this patent is extended or adjusted under 35 U.S.C. 154(b) by 636 days.

(21) Appl. No.: 12/869,919

(22) Filed: Aug. 27, 2010

(65) Prior Publication Data
US 2011/0074932 A1    Mar. 31, 2011

Related U.S. Application Data

(60) Provisional application No. 61/237,382, filed on Aug. 27, 2009.

(51) Int. Cl.
| | |
|---|---|
| *H04N 13/02* | (2006.01) |
| *G01B 11/25* | (2006.01) |
| *G01B 11/16* | (2006.01) |
| *G01B 11/22* | (2006.01) |
| *H04N 13/00* | (2006.01) |

(52) U.S. Cl.
CPC ............. *G01B 11/25* (2013.01); *G01B 11/16* (2013.01); *G01B 11/167* (2013.01); *G01B 11/22* (2013.01); *G01B 11/2545* (2013.01); *H04N 13/0055* (2013.01); *H04N 13/0221* (2013.01)
USPC ................................ 348/50; 348/42; 382/154

(58) Field of Classification Search
CPC .... G01B 11/2513; G01B 11/00; G01B 11/24; H04N 13/0221; H04N 13/0409; H04N 13/0055; H04N 13/0296; G06T 2200/04; G06T 2200/08

USPC .............. 348/36–39, 42, 49, 50, 51; 382/154
See application file for complete search history.

(56) References Cited

U.S. PATENT DOCUMENTS

| | | |
|---|---|---|
| 4,264,921 A | 4/1981 | Pennington et al. |
| 4,727,471 A | 2/1988 | Driels et al. |

(Continued)

FOREIGN PATENT DOCUMENTS

| | | |
|---|---|---|
| EP | 1175106 A2 | 1/2002 |
| GB | 2242270 A | 3/1991 |

(Continued)

OTHER PUBLICATIONS

Chang, N.L., Efficient Dense Correspondences using Temporally Encoded Light Patterns, IEEE, Oct. 12, 2003.

(Continued)

*Primary Examiner* — Sath V Perungavoor
*Assistant Examiner* — Nathnael Aynalem
(74) *Attorney, Agent, or Firm* — One LLP

(57) ABSTRACT

A camera has a lens and aperture device for determining 3D information. A projector projects an optical pattern toward a surface. The camera has at least two off-axis apertures thereon, arranged to obtain an image of the projected pattern including defocused information. The camera is movable between different positions to image the surface from said different positions, and the projector is at a specified angle of at least 5° relative to said camera. A processor carries out a first operation using information received through the apertures to determine a pose of said camera, and to determine three dimensional information about the object based on a degree of deformation of said optical pattern on said surface indicative of a three dimensional surface. An embodiment projects a grid of laser dots and uses laser-dot defocusing for approximate Z and thus grid correspondence, which can greatly increase the working depth of the system.

15 Claims, 2 Drawing Sheets

(56) References Cited

U.S. PATENT DOCUMENTS

| | | | |
|---|---|---|---|
| 4,879,664 A | 11/1989 | Suyama et al. | |
| 4,948,258 A | 8/1990 | Caimi | |
| 5,018,854 A * | 5/1991 | Rioux | 356/609 |
| 5,031,154 A | 7/1991 | Watanabe | |
| 5,075,561 A | 12/1991 | Rioux | |
| 5,168,327 A | 12/1992 | Yamawaki | |
| 5,206,498 A | 4/1993 | Sensui | |
| 5,216,695 A | 6/1993 | Ross et al. | |
| 5,235,857 A | 8/1993 | Anderson | |
| 5,270,795 A | 12/1993 | Blais | |
| 5,351,078 A | 9/1994 | Lemelson | |
| 5,373,151 A | 12/1994 | Eckel, Jr. et al. | |
| 5,579,444 A | 11/1996 | Dalziel et al. | |
| 5,604,344 A | 2/1997 | Finarov | |
| 5,714,762 A | 2/1998 | Li et al. | |
| 5,745,067 A | 4/1998 | Chou et al. | |
| 5,864,359 A | 1/1999 | Kazakevich | |
| 5,922,961 A | 7/1999 | Hsu et al. | |
| 5,986,694 A * | 11/1999 | Iino | 348/135 |
| 6,157,747 A | 12/2000 | Szeliski et al. | |
| 6,229,913 B1 | 5/2001 | Nayar et al. | |
| 6,229,959 B1 | 5/2001 | Suda et al. | |
| 6,271,918 B2 | 8/2001 | Blais | |
| 6,278,847 B1 | 8/2001 | Gharib et al. | |
| 6,304,284 B1 * | 10/2001 | Dunton et al. | 348/36 |
| 6,519,359 B1 * | 2/2003 | Nafis et al. | 382/154 |
| 6,545,701 B2 * | 4/2003 | Sinclair et al. | 348/36 |
| 6,748,112 B1 | 6/2004 | Nguyen et al. | |
| 6,750,904 B1 | 6/2004 | Lambert | |
| 6,765,569 B2 | 7/2004 | Neumann et al. | |
| 6,912,293 B1 | 6/2005 | Korobkin | |
| 6,915,008 B2 | 7/2005 | Barman et al. | |
| 6,943,349 B2 | 9/2005 | Adamec et al. | |
| 6,955,656 B2 | 10/2005 | Bergheim et al. | |
| 6,965,690 B2 | 11/2005 | Matsumoto | |
| 7,006,132 B2 | 2/2006 | Pereira et al. | |
| 7,171,054 B2 | 1/2007 | Fiete et al. | |
| 7,236,622 B2 | 6/2007 | Chen et al. | |
| 7,260,274 B2 | 8/2007 | Sawhney et al. | |
| 7,271,377 B2 | 9/2007 | Mueller et al. | |
| 7,340,077 B2 | 3/2008 | Gokturk et al. | |
| 7,372,642 B2 | 5/2008 | Rohaly et al. | |
| 7,423,666 B2 | 9/2008 | Sakakibara et al. | |
| 7,496,226 B2 | 2/2009 | Negahdaripour et al. | |
| 7,565,029 B2 | 7/2009 | Zhou et al. | |
| 7,605,817 B2 * | 10/2009 | Zhang et al. | 345/473 |
| 7,612,869 B2 | 11/2009 | Pereira et al. | |
| 7,612,870 B2 | 11/2009 | Graff et al. | |
| 7,668,388 B2 | 2/2010 | Bryll | |
| 7,715,918 B2 | 5/2010 | Melvin | |
| 7,747,151 B2 | 6/2010 | Kochi et al. | |
| 7,819,591 B2 | 10/2010 | Rohaly et al. | |
| 7,916,309 B2 | 3/2011 | Gharib et al. | |
| 8,179,424 B2 | 5/2012 | Moller | |
| 2003/0096210 A1 | 5/2003 | Rubbert et al. | |
| 2003/0125719 A1 | 7/2003 | Furnish | |
| 2003/0160970 A1 | 8/2003 | Basu et al. | |
| 2003/0210407 A1 | 11/2003 | Xu | |
| 2004/0136567 A1 | 7/2004 | Billinghurst et al. | |
| 2004/0155975 A1 | 8/2004 | Hart et al. | |
| 2005/0025116 A1 | 2/2005 | Chen et al. | |
| 2006/0044546 A1 | 3/2006 | Lewin et al. | |
| 2006/0092314 A1 | 5/2006 | Silverstein et al. | |
| 2006/0098872 A1 | 5/2006 | Seo et al. | |
| 2006/0209193 A1 | 9/2006 | Pereira et al. | |
| 2006/0285741 A1 | 12/2006 | Subbarao | |
| 2007/0008312 A1 | 1/2007 | Zhou et al. | |
| 2007/0056768 A1 | 3/2007 | Hsieh et al. | |
| 2007/0076090 A1 | 4/2007 | Alexander | |
| 2007/0078500 A1 | 4/2007 | Ryan et al. | |
| 2007/0103460 A1 | 5/2007 | Zhang et al. | |
| 2007/0146700 A1 | 6/2007 | Kowarz et al. | |
| 2007/0188769 A1 | 8/2007 | Rohaly et al. | |
| 2007/0195162 A1 | 8/2007 | Graff et al. | |
| 2007/0236694 A1 | 10/2007 | Gharib et al. | |
| 2008/0031513 A1 * | 2/2008 | Hart | 382/154 |
| 2008/0091691 A1 | 4/2008 | Tsuji | |
| 2008/0180436 A1 | 7/2008 | Kraver | |
| 2008/0239316 A1 | 10/2008 | Gharib et al. | |
| 2008/0259354 A1 | 10/2008 | Gharib et al. | |
| 2008/0278804 A1 | 11/2008 | Gharib et al. | |
| 2009/0129667 A1 | 5/2009 | Ho et al. | |
| 2009/0238449 A1 | 9/2009 | Zhang et al. | |
| 2009/0295908 A1 | 12/2009 | Gharib et al. | |
| 2010/0007718 A1 | 1/2010 | Rohaly, Jr. et al. | |
| 2011/0074932 A1 | 3/2011 | Gharib et al. | |

FOREIGN PATENT DOCUMENTS

| | | |
|---|---|---|
| JP | 2655885 B2 | 9/1997 |
| JP | 2001-16610 A | 8/2002 |
| JP | 2001-61165 A | 9/2002 |
| JP | 2003-289293 A | 10/2003 |
| JP | 2004-191240 A | 7/2004 |
| WO | WO 88/00710 A1 | 1/1988 |
| WO | WO 96/41304 A1 | 12/1996 |
| WO | WO 00/69357 A1 | 11/2000 |
| WO | WO 01/86281 A1 | 11/2001 |
| WO | WO 02/096478 A2 | 12/2002 |
| WO | WO 2006/009786 A2 | 1/2006 |
| WO | WO 2007/041542 A2 | 4/2007 |
| WO | WO 2007/056768 A2 | 5/2007 |
| WO | WO 2007/095307 A1 | 8/2007 |
| WO | WO 2007/130122 A2 | 11/2007 |
| WO | WO 2008/091691 A1 | 7/2008 |

OTHER PUBLICATIONS

Dellaert, F. et al., Structure from Motion without Correspondence, Computer Vision & Pattern Recognition, 2000.

El-Hakim, S.F. et al., A System for Indoor 3-D Mapping and Virtual Environments, Proceedings of the SPIE, 1997.

Favaro, P. et al., Observing Shape from Defocused Images, Int'l Journal of Computer Vision, 52(1), 25-43, 2003.

Guarnieri, A et al., 3D Modeling of Real Artistic Objects with Limited Computers Resources, Proc. Of XVIII CIPA Symposium on Architectural & Archaeological Photogrammetry, Oct. 1999.

Horn, E. et al., Toward Optimal Structured Light Patterns, 3DIM, 1997.

Koninckx, T.P. et al., A Graph Cut based Adaptive Structured Light approach for real-time Range Acquision, 3EDPVT, 2004.

Kordelas, G. et al., State-of-the-art Algorithms for Complete 3D Model Recoonstruction, "Engage" Summer School, 2010.

Levenberg, K., A Method for the Solution of Certain Non-Linear Problems in Least Squares, Quarterly of Applied Mathematics, vol. II, No. 2, Jul. 1944.

Li, S.Z., Markov Random Field Models in Computer Vision, Springer-Verlag, 1995.

Lowe, D.G., Three-Dimensional Object Recognition from Single Two-Dimensional Images, Artificial Intelligence, 31, 3, Mar. 1987, pp. 355-395.

Lowe, D.G., Object Recognition from Local-Invariant Features. Proc. of the Int'l Conference on Computer Vision, Sep. 1999.

Makadia, A. et al., Fully Automatic Registration of 3D Point Clouds, Proceedings of the 2006 IEEE Computer Society Conference on Computer Vision and Pattern Recognition, 2006.

Marquardt, D.W., An Algorithm for Least-Squares Estimation of Nonlinear Parameters, Journal of the Sociey for Industrial and Applied Mathematics, vol. 11, No. 2, Jun. 1963, pp. 431-441.

Mouaddib, E et al., Recent Progress in Structured Light in order to Solve the Correspondence Problem in Stereo Vision, Proceedings of the 1997 IEEE, Apr. 1997.

Neugebauer, P.J., Geometrical Cloning of 3D Objects via Simultaneous Registration of Multiple Range Images, Shape Modeling & Application, Mar. 1997.

Nguyen V.A. et al., Detection of the depth order of defocused images, Vision Research 45, 2005, pp. 1003-1011.

Pagès, J. et al., Implementaion of a Robust Coded Structured Light Technique for Dynamic 3D Measurements, ICIP, 2003.

(56) References Cited

OTHER PUBLICATIONS

Pereira, F. et al., Two-frame 3D particle tracking, Measurement Science and Technology 17, 2006, pp. 1680-1692.
Raij, A. et al., PixelFlex2: A Comprehensive, Automatic, Casually-Aligned Multi-Projector Display, PROCAMS, 2003.
Raskar, R. et al., Multi-Projector Displays Using Camera-Based Registration, IEEE Visualization, 1999.
Rocchini, C et al., A low cost 3D scanner based on structured light, Computer Graphics Forum (Eurographics 2001 Conf. Issue).
Rusinkiewicz, S. et al., Real-Time 3D Model Acquisition, ACM Transactions on Graphics, 2002.
Salvi, J. et al., Pattern condification strategies in structured light systems, Pattern Recognition, 2004.
Scharstein, D. et al., A Taxonomy and Evaluaion of Dense Two-Frame Stereo Correspondence Algorithms, IJCV, 2002.
Scharstein, D. et al., High-Accuracy Stereo Depth Maps Using Structured Light, IEEE Computer Society Conf. on Computer Vision and Pattern Recognition, 2003, vol. 1, pp. 195-202.
Sinofsky, Measurement of Laser Beam Spreading in Biological Tissue Scattering, SPIE vol. 712, Lasers in Medicine (1986).
Smith, E.R. et al., Registration of combined range-intensity scans: Intialization through verification, Computer Vision and Image Understanding 110, 2008, pp. 226-244.
Subbarao, M. et al., Analysis of Defocused Image Data for 3D Shape Recovery using a Regularization Technique, SPIE, 1997.
Tardif, J. Multi-projectors for arbitrary surfaces without explicit calibration and reconstruction, DIM, 2003.
Tardif, J. et al., A MRF formulation for coded structured light, Proceedings of the $5^{th}$ Int'l Conf. on 3-D Imaging & Modeling, 2005.
Wang, Z. et al., Extraction of the Corner of Checkerboard Image, Proceedings of the $7^{th}$ World Congress on Intelligent Control and Automation, Jun. 25-27, 2008.
Weisstein, E., Gray Code, http://mathworld.wolfram.com/GrayCode.html.
Willert, C.E. et al., Three-dimensional particle imaging with a single camera, Experiments in Fluids 12, 1992, pp. 353-358.
Williams, J.A. et al., Multiple View 3D Registration: A Review and a New Technique, Systems Man. & Cybernetics 10, 1999.
Wu, M. et al., Three-dimensional fluorescent particle tracking at micron-scale using a single camera, Experiments in Fluids, 2005, pp. 461-465.
Yang, R. et al., PixelFlex: A Reconfigurable Multi-Projector Display System, IEEE Visualization, 2001.
Zhang, S. et al., High-resolution, Real-time 3D Shape Acquisition, IEEE Workshop of real-time 3D sensors & their uses, 2004.
PCT/US2008/000991, US, International Search Report/Written Opinion, Jul. 28, 2009.
PCT/US2008/000882, US, International Preliminary Report on Patentability, Aug. 6, 2009.
PCT/US2008/000882, US, International Search Report, Jul. 5, 2009.
PCT/US2008/005313, US, International Preliminary Report on Patentability/Written Opinion, Oct. 27, 2009.
PCT/US/2008/005314, US, International Preliminary Report on Patentability/Written Opinion, Oct. 27, 2009.
PCT/US2008005315, US, International Preliminary Report on Patentability/Written Opinion, Oct. 27, 2009.
200824494, AU, Examiner's First Report, Aug. 18, 2010.
PCT/US2008/005311, International Preliminary Report on Patentability/Written Opinion, Oct/ 27, 2009.
PCT/US2008/00514, US, International Search Report, Sep. 8, 2008.
PCT/US2008/000991, US, International Preliminary Report on Patentability, Jul. 31, 2008.
PCT/US2005/021326, US, International Search Report, Feb. 1, 2007.
PCT/US2009/004362, US, Search Report, May 27, 2010.
PCT/US2009/004362, US, Preliminary Report on Patentability/Written Opinion, May 27, 2010.

* cited by examiner

ACCURATE 3D OBJECT RECONSTRUCTION USING A HANDHELD DEVICE WITH A PROJECTED LIGHT PATTERN

This application claims priority from provisional application No. 61/237,382, filed Aug. 27, 2009, the entire contents of which are herewith incorporated by reference.

BACKGROUND

Different techniques are known for three dimensional imaging.

It is known to carry out three dimensional particle imaging with a single camera. This is also called quantitative volume imaging. One technique, described by Willert and Gharib uses a special defocusing mask relative to the camera lens. This mask is used to generate multiple images from each scattering site on the item to be imaged. This site can include particles, bubbles or any other optically-identifiable image feature. The images are then focused onto an image sensor e.g. a charge coupled device, CCD. This system allows accurately, three dimensionally determining the position and size of the scattering centers.

Another technique is called aperture coded imaging. This technique uses off-axis apertures to measure the depth and location of a scattering site. The shifts in the images caused by these off-axis apertures are monitored, to determine the three-dimensional position of the site or sites.

U.S. Pat. No. 7,006,132 describes a geometric analysis in which a camera lens of focal length f is located at z=0. Two small apertures are placed within the lens, separated a distance d/2 away from the optical centerline which also corresponds to the z axis.

U.S. Pat. No. 7,006,132 describes using lens laws and self similar triangle analysis to find the geometrical center (X0, Y0) of the image pair, and then to solve for the image separation.

More generally, this can determine the pose of a camera that is obtaining the information, and the information from the camera, to determine 3D information about structures that is pieced together from multiple different images.

U.S. 2009/0295908 describes how camera pose can be measured by using a set of apertures that measure a pose of the camera relative to the object when using a feature matching algorithm, using the same apertures that are used for defocusing.

There are often tradeoffs in aperture coded systems for obtaining defocused information, of this type.

SUMMARY

As described in more detail in the following section, in one embodiment a camera has a lens and aperture device for determining 3D information. A projector projects an optical pattern toward a surface. The camera has at least two off-axis apertures thereon, arranged to obtain an image of the projected pattern including defocused information. The camera is movable between different positions to image the surface from said different positions, and the projector is at a specified angle of at least 5° relative to said camera. A processor carries out a first operation using information received through the apertures to determine a pose of said camera, and to determine three dimensional information about the object based on a degree of deformation of said optical pattern on said surface indicative of a three dimensional surface. An embodiment projects a grid of laser dots and uses laser-dot defocusing for approximate Z and thus grid correspondence, which can greatly increase the working depth of the system.

DETAILED DESCRIPTION

Accurate three-dimensional (3D) shape measurement of objects using a handheld or portable device can be achieved by using 3D imaging techniques along with the relative pose (i.e., translation and rotation) of a moving camera. Patent application U.S. 2009/0295908, entitled "Method and Device for High-Resolution Three-Dimensional Imaging Which Obtains Camera Pose Using Defocusing", described how to determine a moving camera pose using a feature matching (such as Scale Invariant Feature Transform) or an error minimization (such as Levenberg-Marquardt) method. The pose of the camera can be used to transform data obtained at different times, to stitch together multiple different pieces of information to form a composite 3D imaging.

Active stereo (Kiessling, 1976) is a 3D imaging method that operates by projecting a structured or random light pattern on an object surface and capturing an image of that light pattern with a camera. The system has historically been calibrated. The characteristics of the plane projection on the system are obtained for the known calibration sample. The light pattern is projected onto the surface from an angle relative to the camera such that the light appears to be at different locations based on the distance to the object or to a point on the object.

Figure 1:
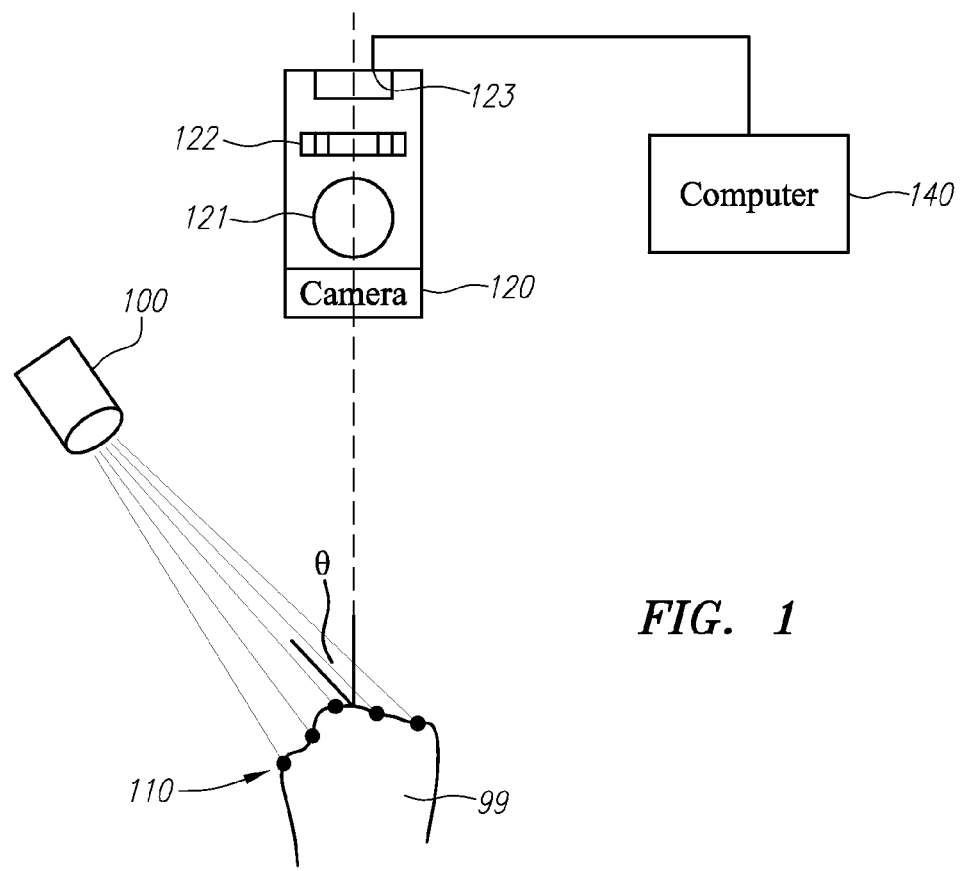
FIG. 1 shows the camera with a picture taking lens.

An embodiment is shown in FIG. 1. A projector 100 projects a pattern 99 on to a three dimensional item 99 being imaged. A camera 120 images object 99. The pattern is projected from an angle Θ relative to the camera 120. The pattern projected by the light deforms based on the varying surface depth of the surface being viewed. The camera includes a lens 121 or lenses, a plate 122 with at least two apertures, and an image sensor 123. The output of the image sensor 123 is coupled to a computer 140 that uses the information to determine information as described herein.

The way that the pattern 110 deforms is based on the angle of projection. An initial calibration (or calculation) can determine a relationship between different amounts of deformation of the pattern, and the 3D features on the object surface. Information is then obtained by using the computer 140 analyzing the pattern deformation using equations that model the surface obtained from the calibration phase.

High accuracy in depth measurement can be achieved. In one embodiment, the angle Θ between the pattern projector and the camera is relatively large, e.g., 30 degrees, or 45 degrees, or greater, to increase the accuracy. For instance, the out-of-plane (z) to in-plane (x, y) error ratio is 1 when light is projected at 45 degrees. However, smaller angles, e.g., as small as 5-10 degrees would work for some systems where the accuracy does not need to be as great.

Defocusing can also be used for obtaining 3D information. As described system using defocusing to measure 3D objects was described by Willert & Gharib in 1992 using a feature matching system such as the Scale Invariant Feature Transform (SIFT) or an error minimization method (such as the Levenberg-Marquardt) method. This determines the x and y position from the images, and uses the differences in positions between images obtained from off-axis apertures to determine the z-axis values of the image surface.

A camera 100 can also be characterized according to its "pose", that is the specific position of the camera in space when it was used to obtain the information. This pose detection is described in general in U.S. 2009/0295908, entitled "Method and Device for High Resolution Three Dimensional Imaging Which Obtains Camera Pose Using Defocusing."

According to an embodiment, an active stereo operation is used along with automated camera "pose" determination to obtain high accuracy 3D object reconstruction of an item being sampled. In the imaging system, a set of off-axis apertures are used to simultaneously measure the pose of a moving camera as described in Patent application U.S. 2009/0295908. At least two color coded apertures are used which produce optical channels that are separable from each other. Other apertures for active stereo imaging may also be used when using feature matching to resolve the camera pose. Three apertures without color coding may be used when using an error minimization method.

A grid 110 of laser dots is projected from an angle (e.g., a 45 degree angle) to the item. Information is also received through an aperture, e.g., a center aperture or a set of two or more off-axis apertures 122 used in the camera 120 to acquire the pattern images on the object surface. The planar coordinates of the pattern (x, y) are measured from the acquired images for deformation analysis in order to resolve the depth (z) information. A complete 3D shape of an object is reconstructed by moving the handheld device around the object surface and overlaying the 3D coordinates obtained from the projected pattern.

A defocusing concept such as described above in the Willert & Gharib, 1992 paper, and in the U.S. 2009/0295908 application, may be applied according to an embodiment to more accurately determine the (x, y) coordinates when using a set of off-axis apertures. In the embodiment, multiple defocusing dot images are generated from each projected dot. The inventors recognize, however, that uncertainties always occur in the dot centroid detection due to the laser speckles. Averaging centroids of a set of defocusing dot images can be used to reduce the uncertainty level. Additionally, the z coordinates of the laser dots can also be resolved from the defocusing images at a lower accuracy, (due to the higher out-of-plane to in-plane error ratio generated from the off-axis apertures), which helps finding the correspondence of each deformed dot to the original projected pattern. By finding the correspondence of the deformed of dots to the original projected pattern, the approximate z axis coordinates of these dots can be determined (where the z axis is the axis between the projector/camera and the sample). Even though this correspondence may be at lower accuracy, this lower accuracy information can still greatly increase the working depth of the system, and can allow the active stereo imaging to be used in many more applications, including at lower angles and over greater working depths.

In order to combine with the pose measuring system with feature matching, the set of off-axis apertures for active stereo imaging may be separable from the two color coded apertures.

In a simpler embodiment, only three apertures without color coding are used for both pose measurement by error minimization and active stereo imaging.

According to other embodiments, other structured patterns (such as a grid of lines) or a random pattern can also be used in the projection. Other embodiments may use the light source as a laser, an LED or any other kind of other light generator.

In the embodiments described above, the apertures may be color coded to red and green. In other embodiments, these apertures on aperture plate 122 may be encoded in any way with different colors, different polarizations, or different shapes, or any other way of distinguishing between the apertures to form different color channels. This technique can be implemented with any kind of image sensor and camera. The 3D+pose information is encoded by the apertures.

Coding of the aperture(s) is required when using feature matching to measure camera pose. Color coding can be used in one embodiment. For example, three green coded apertures can be placed in a triangular pattern for defocusing with one red and one blue aperture placed on opposite sides for pose.

Alternatively, one blue and one red aperture can be used.

Figure 2:
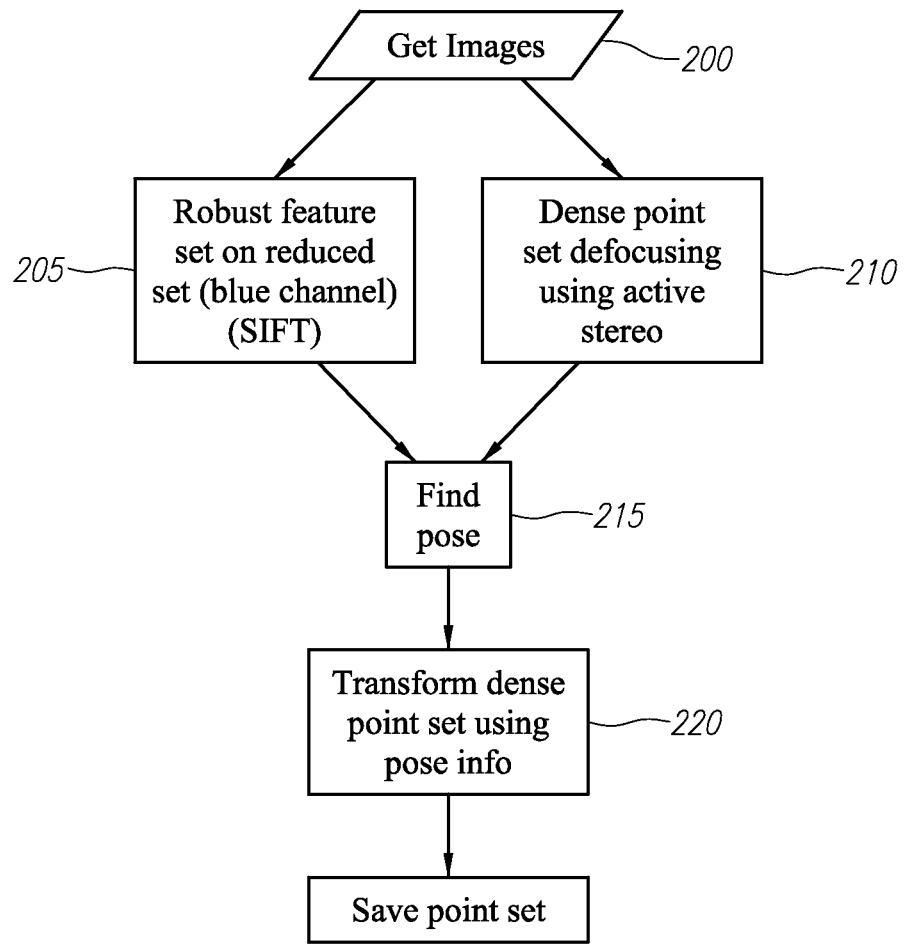
FIG. 2 shows the camera with a special defocus lens assembly on the same body as in FIG. 1, and a computer system.

FIG. 2 shows a general flowchart of the operation of the image determination and processing according to an embodiment.

At 200, the system obtains image information at a first time t1 when the camera 100 is at a pose defined by its T, which includes translation 1 (t1) and rotation 1 (r1). In an embodiment, this can capture multiple images through multiple apertures, in a way that allows distinguishing between the apertures. In the embodiment, color filters are used to separate between the channels, as described above. One of the apertures can be associated with a red filter to only or predominately pass the red light. The other aperture can be associated with a blue filter to only or predominately pass the blue light. This forms two channels of information, one having passed through each of two separated apertures.

According to another embodiment, rather than separating the channels by colors, the apertures are arranged in a specified arrangement such as an equilateral triangle, and the processor 140 recognizes that equilateral triangle in the final image to find the different channels.

According to another embodiment, the different channels can be formed by modifying polarizations of different channels, by putting different polarizations on the different apertures and using those different polarizations as the different channels. The channels can be formed in different ways by providing different physical mask shapes, or by time division changing the aperture e.g. by moving it from place to place.

At 205, robust feature detector is used to determine references on the current image frame using a reduced data set, here the blue channel. Note that the image frame obtained at any one time will be smaller than the overall image frame. The references are referred to herein as being keypoints, but any reference that can be recognized in different images can be used.

The robust feature detector finds two-dimensional information (x, y) of the position of the keypoints as well as a feature vector style descriptor for those keypoints. That feature vector style descriptor will stay constant at any scale rotation and lighting for the points.

The feature vector style descriptor can be obtained by extracting interesting points on the object to provide a "feature description" of the object. This description has enough information that can be used to identify the object when attempting to locate the object in other images containing other objects. The features extracted from the training image are selected to be robust to changes in image scale, noise, illumination, and local geometric distortion to perform reliable recognition. This may use techniques, for example, described in U.S. Pat. No. 6,711,293. The commercially available scale invariant feature transform (SIFT) software can be used for this detection.

Three dimensional point information for each of the keypoints is also determined at 210. This can use, for example, the detection of the active stereo information projected by the camera 100 at the angle.

315 forms a map of the different ts. It matches the different parts of the three dimensional information corresponding to the keypoints in order to obtain the transformation T (translation and rotation) between the ts. This finds information indicative of the "pose" of the camera at this time.

220 represents transforming the active stereo information for each obtained frame to using the pose information.

At 225, the dense point set is saved.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of processing can be used. Any camera type can be used, including a CCD camera, active pixel, or any other type.

The cameras described herein can be handheld portable units, or machine vision cameras, or underwater units.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other shapes of apertures can be used, including round, oval, triangular, and/or elongated. The above devices can be used with color filters for coding different apertures, but can also be used with polarization or other coding schemes.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
    a projector that projects an optical pattern toward a surface at an angle of projection;
    a camera, including a first plate with at least two off-axis apertures thereon, arranged to obtain an image of the optical pattern that has been projected, said camera being movable between different positions to image the surface from said different positions,
    said projector and said angle of projection being at a specified angle of at least 30° relative to said camera; and
    a processor that receives information from said camera, said information indicative of imaged scenes at different times, wherein said processor uses information received through said apertures to determine a relationship, based on the angle of projection of the optical pattern, between different amounts of deformation of the projected pattern and a feature of the surface, to determine a pose of said camera, and to determine three dimensional information about said surface based on a degree of deformation of said optical pattern on said surface, said pose and said three dimensional information obtained from multiple different poses of said camera, and wherein said processor combines together said three dimensional information from said multiple poses using each of a plurality of poses.

2. A system as in claim 1, wherein said projector projects a grid of laser dots.

3. A system as in claim 1, wherein said projector projects a random pattern of dots.

4. A system as in claim 1, wherein said projector projects a grid of optical dots, and said processor uses defocused information from said optical dots to determine a correspondence of the optical dots to the grid and to determine an approximate Z axis correspondence based on said defocused information.

5. A system as in claim 4, wherein said processor averages centroids of images within the defocused information.

6. A system as in claim 1, wherein said angle is at least 45°.

7. A method, comprising:
    projecting an optical pattern toward a surface;
    receiving an image which has passed through a plate with at least two off-axis apertures in a camera, said camera being movable between different positions to image the surface from said different positions,
    wherein said projecting is from a specified angle of at least 30° relative to an axis of said camera;
    receiving information from said camera, said information being indicative of imaged scenes at different times;
    using information received through said apertures to determine a relationship, based on the specified angle of projection of the pattern, between different amounts of deformation of the projected pattern and a feature of said surface, to determine a pose of said camera, and to determine three dimensional information about said surface based on a degree of deformation of said optical pattern on said surface, and
    combining together said three dimensional information from said pose with three dimensional information determined from another pose to generate a three dimensional image.

8. A method as in claim 7, wherein said projecting comprises projecting a grid of optical dots.

9. A method as in claim 7, wherein said projecting comprises projecting a random pattern.

10. A method as in claim 8, wherein said projecting comprises projecting laser dots.

11. A method as in claim 8, further comprising using defocused information from said optical pattern to determine a correspondence of the optical pattern to the grid and to determine an approximate Z axis correspondence based on said defocused information.

12. A method as in claim 11, further comprising averaging centroids of the defocused information.

13. A system, comprising:
    a laser dot projector that projects a grid of laser dots toward a surface to be imaged;
    a camera including a first plate with at least two off-axis apertures thereon, said camera arranged to obtain an image of the projected laser dots from said surface,
    said projector projecting a beam at a specified angle of at least 30° relative to an axis of said camera; and
    a processor that is programmed to receive information from said camera, and to use defocused information from said image of said laser dots to determine a relationship, based on the specified angle of the beam, between different amounts of deformation of the projected laser dots and a feature of said surface, to determine a correspondence of said image of said laser dots to the grid, to determine an approximate Z axis correspondence based on said defocused information, and to determine three dimensional information about said surface based on a degree of deformation of said laser grid on said surface, including the determination of centroids of said defocused information from said image of said laser dots, wherein said camera is movable between different positions to image said surface from said different positions, and said processor is programmed to use information received through said apertures to determine a pose of said camera, and is programmed to combine together said three dimensional information from said multiple poses of said camera, to determine an overall three dimensional information obtained from multiple different poses of said camera.

14. A system as in claim 13, wherein said angle is at least 45°.

15. A method as in claim 7, wherein said angle is at least 45°.

* * * * *